(12) United States Patent
Ariyur

(10) Patent No.: US 7,474,992 B2
(45) Date of Patent: Jan. 6, 2009

(54) TRENDING SYSTEM

(75) Inventor: Kartik B. Ariyur, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 419 days.

(21) Appl. No.: 11/063,296

(22) Filed: Feb. 22, 2005

(65) Prior Publication Data
US 2005/0165520 A1  Jul. 28, 2005

Related U.S. Application Data

(63) Continuation-in-part of application No. 10/767,034, filed on Jan. 28, 2004.

(51) Int. Cl.
*G06F 15/00* (2006.01)
*H04B 17/00* (2006.01)

(52) U.S. Cl. .................. 702/190; 455/67.11; 702/79

(58) Field of Classification Search .............. 702/34, 702/45, 56, 132, 179, 182, 185, 188, 190, 702/194; 701/29, 99, 100, 110, 114; 342/64; 707/2; 708/203, 303; 700/28, 203; 375/227; 455/67.11, 67.1
See application file for complete search history.

(56) References Cited

U.S. PATENT DOCUMENTS

| | | | |
|---|---|---|---|
| 5,319,583 A * | 6/1994 | Wildes | 708/303 |
| 5,341,142 A * | 8/1994 | Reis et al. | 342/64 |
| 6,704,353 B1 * | 3/2004 | McCarty et al. | 375/227 |
| 6,996,374 B1 * | 2/2006 | Bao et al. | 455/67.11 |
| 2002/0100009 A1 | 7/2002 | Xing et al. | |
| 2002/0120416 A1 | 8/2002 | Liu et al. | |
| 2005/0165520 A1 * | 7/2005 | Ariyur | 701/29 |

OTHER PUBLICATIONS

Bohm et al., "Determining the Convex Hull in Large Multidimensional Databases," International Conference on Data Warehousing and Knowledge Discovery, 10 pages, 2001.

* cited by examiner

*Primary Examiner*—John H Le
(74) *Attorney, Agent, or Firm*—Kris T. Fredrick

(57) ABSTRACT

A trending system and method for trending data in a physical or clock system. The trending system includes a sliding window filter. The sliding window filter receives a data set of data points generated by the clock system. The sliding window filter partitions the data set into a plurality of data windows, and uses the data windows to calculate upper and lower confidence bounds for the data set. Specifically, the sliding window filter calculates upper confidence bounds and lower confidence bounds for each data point using each of the multiple data windows that includes the data point. The sliding window filter then selects the upper confidence bounds and the lower confidence bounds that result in the smallest mean prediction confidence interval for that data point. This results in a smoothed estimated trend for the data set that can be used for prognostication and fault detection.

21 Claims, 11 Drawing Sheets

TRENDING SYSTEM

This invention is a Continuation-in-Part of U.S. patent application Ser. No. 10/767,034, filed Jan. 28, 2004, and entitled "Trending System and Method Using Window Filtering".

BACKGROUND

This invention relates to physical systems, and particularly relates to trending systems for physical systems. More particularly, the invention relates to trending for clock systems.

Modern physical systems can be exceedingly complex. The complexities of modern systems have led to increasing needs for automated prognosis and fault detection systems. The latter systems are designed to monitor the system in an effort to predict the future performance of the physical systems and detect potential faults. The detection systems are further designed to detect these potential faults such that the faults can be addressed before they lead to failure in a physical system.

Physical systems include a variety of mechanical and electrical systems. One type of system where prognosis and fault detection is of particular importance is clock and timing systems. In these systems, prognosis and fault detection may pinpoint and address potential faults before they result in serious system failures, possible shutdowns, aborts, delays, or other malfunctions.

Current prognosis and fault detection systems have relied upon trending of data from timing systems to predict future performance and detect likely faults. In general, data trending involves filtering data to generate a more accurate, filtered estimate of the data. Additionally, data trending may include generating predicted likely future values for sensor data. Each of the various data trending functions facilitates prognosis and fault detection in the systems.

Past systems have used various statistical techniques for filtering data. As examples, these trending systems have used Kalman filters or exponential filters to filter data. Unfortunately, these trending systems suffered from many limitations. One particular limitation in Kalman filters is that such filters have often relied upon certain statistical assumptions which are not be valid for some applications. Thus, Kalman filters do not appear to be reasonably applicable to filtering data. Another limitation of these trending systems using Kalman filters is a lack of accuracy. Thus, these trending systems are unable to accurately determine current sensor values or predict likely future values. This lack of accuracy limits the effectiveness of prognosis and fault detection, resulting in potentially unexpected faults and/or false detection of future faults. Other methods such as neural networks and fuzzy logic have also been used for predictions from data. However, these methods generally need careful tuning to the problem at hand. Furthermore, they do not generally provide a quantitative estimate of the reliability of their predictions. Thus, there is a need for improved systems and methods for trending data that offer improved accuracy and reliability.

SUMMARY

The present invention provides a system for trending data in a physical system. The trending system may include a sliding window filter. The sliding window filter may receive a data set of data points generated by the physical system. The sliding window filter may partition the data set into several data windows, and use these windows to calculate upper and lower confidence bounds for the data set. Specifically, the sliding window filter may calculate upper confidence bounds and lower confidence bounds for each data point using each of the multiple data windows that includes the data point. The sliding window filter may then select the upper confidence bound and the lower confidence bound that result in the smallest mean prediction confidence interval for that data point. This may result in a smoothed estimated trend for the data set that may be used for prognostication and fault detection.

In some illustrative examples, the trending system may also include a trend change detection mechanism. The trend change detection mechanism may determine a first convex hull for the upper confidence bounds and a second convex hull for the lower confidence bounds. The trend change detection mechanism may compare the first convex hull and the second convex hull to determine a transition point in the data set. With the transition point determined, the trend change detection mechanism may determine a likely future trend for the data set based on the transition point and the points in the data appearing after the transition point.

In further illustrative examples, the trending system may also include an outlier elimination mechanism. The outlier elimination mechanism may use a left sample window, a right sample window and a test window to determine which, if any data points in the data set are statistical outliers. Specifically, the outlier elimination mechanism may generate a first prediction cone from data points in the left sample window, and generate a second prediction cone from data points in the right sample window. The outlier elimination mechanism may then determine if data points in the test window reside in the first prediction cone or the second prediction cone. If a data point in the test window does not reside in either the first prediction cone or the second prediction cone, then it may be considered a statistical outlier and removed prior to trending the data set.

DESCRIPTION

The present invention may provide a trending system for trending data in a physical system, such as a clock system. The trending system may receive data from the physical system and generate a smoothed estimated trend for the data set. This estimated trend may then be used to more accurately determine the performance of the physical system and prognosticate future performance. The performance of the clock system (i.e., a physical system) may be a time indication that the clock system provides over time relative to a reference time. If the clock system is to operate independently of a reference clock, the trend determination may provide the clock time indication at a particular time of a reference. With the trend information, the reference time may be determined from the time indication of the clock system.

A clock having a trending system associated with it may operate accurately for a much longer time independently from a reference or system clock. Such a clock may enable low power wireless sensor networks, using, for example, frequency hopping spread spectrum (FHSS) communication between wireless sensors (or other outlying or remote devices such as leaf nodes) and a central system or infrastructure nodes. Synchronization in FHSS can consume a large amount of power in the sensor. By the time the sensor clock drift is accounted for and the system or infrastructure node (as used in wireless sensor network architecture) and sensor synchronize their transmissions, a large amount of power may be wasted in the wireless sensor. This may severely limit battery life on the sensor.

By keeping track of the clock drift on each sensor (in the powered infrastructure node), the time spent in synchronization may be greatly reduced and mostly eliminated. Thus, the time of battery life of the sensor may be significantly increased and concomitant maintenance operations substantially reduced.

Figure 1:
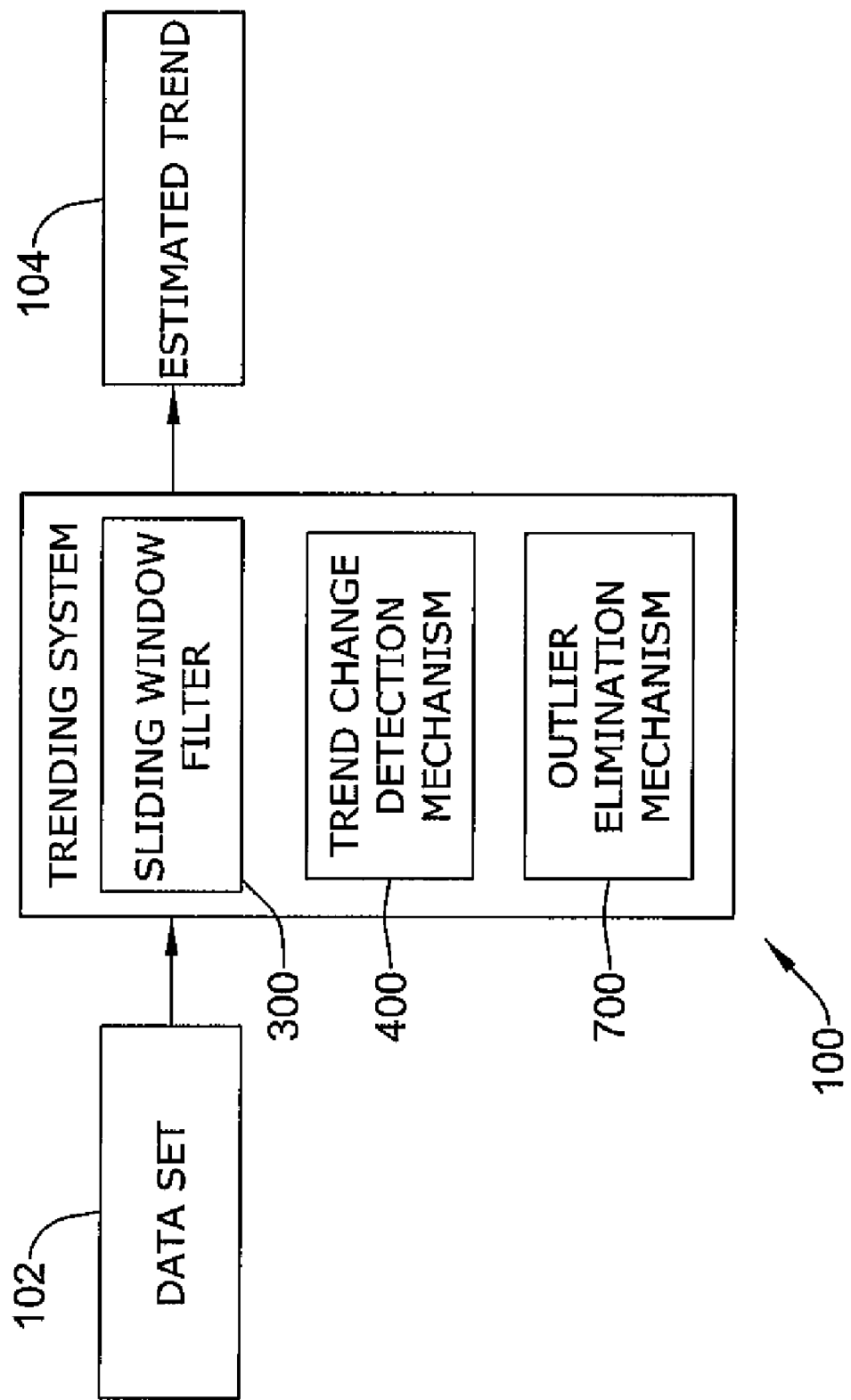
FIG. 1 is a schematic view of a trending system.

Turning to FIG. 1, a trending system 100 is illustrated schematically. The trending system 100 may include a sliding window filter 300, a trend change detection mechanism 400, and an outlier elimination mechanism 700. The sliding window filter may receive a data set 102 of data points generated by the physical system. The sliding window filter 300 may partition the data set 102 using several data windows, and use the data windows to calculate upper and lower confidence bounds for the data set. Specifically, the sliding window filter 300 may calculate upper confidence bounds and lower confidence bounds for each data point using each of the multiple data windows that includes the data point. The sliding window filter 300 may then select the upper confidence bounds and the lower confidence bounds that result in the smallest mean prediction confidence interval for that data point. The mid points of the resulting best confidence intervals may provide a smoothed estimated trend 104 for the data set 102 that can be used for prognostication and fault detection.

The trending system 100 may also include a trend change detection mechanism 400. Such a mechanism may be desirable in the trending system 100 for determining the last linear trend detectable in a data set 102. The trend change detection mechanism 400 may determine a first convex hull for the upper confidence bounds and a second convex hull for the lower confidence bound. The trend change detection mechanism 400 may compare the first convex hull and the second convex hull to determine a transition point in the data set 102. With the transition point determined, the trend change detection mechanism 400 may determine a likely future trend for the data set based on the transition point and the upper confidence bounds and lower confidence bounds.

The trending system 100 may also include an outlier elimination mechanism 700. The outlier elimination mechanism 700 may be desirable for applications where significant portions of the data are subject to noise or other corruption. The outlier elimination mechanism 700 may use a left sample window 701, a right sample window 703 and a test window 702 (FIG. 7) to determine which, if any data points in the data set 102 are statistical outliers. Specifically, the outlier elimination mechanism 700 may generate a first prediction cone from data points in the left sample window 701, and generate a second prediction cone from data points in the right sample window 703. The outlier elimination mechanism 700 may then determine if data points in the test window 702 reside in the first prediction cone and the second prediction cone. If a data point in the test window 702 does not reside in either the first prediction cone or the second prediction cone, then it may be considered a statistical outlier and removed prior to filtering and trending the data set 102.

Figure 2:
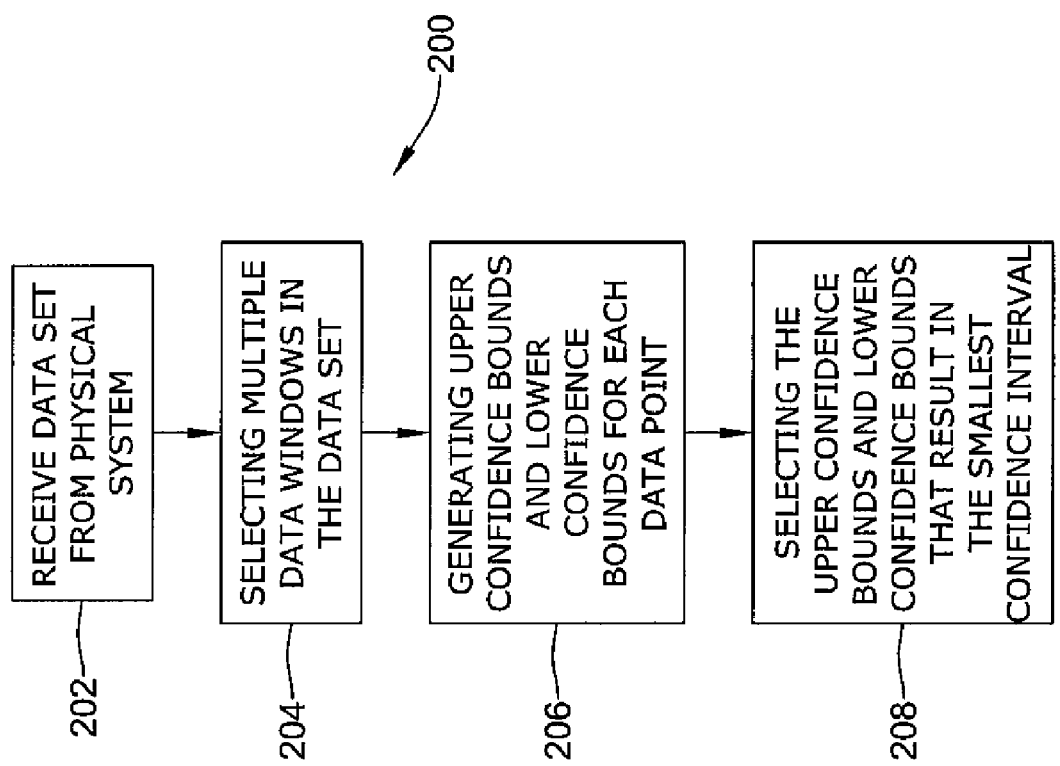
FIG. 2 is a flow diagram illustrating a trending approach.

Turning to FIG. 2, an approach 200 of generating a smoothed estimated trend may be illustrated. The first step 202 of approach 200 may be to receive a data set 102 from the physical system. The data set 102 may comprise numerous data points generated by the physical system from which an estimated trend 104 is to be generated. It should again be noted the approach 200 may be used for trending performance in a variety of physical systems that produce a series of outputs over time, including electrical and mechanical systems. In an illustrative example, the system may be used for trending performance in clocks and related systems such as wireless systems. In a clock implementation, the data set 102 may comprise comparative data received from the clocks or clock systems.

The next step 204 of approach 200 may be to select multiple data windows in the data set 102. Each of the data windows may include a subset plurality of data points in the data set 102, and to be used to generate upper and lower confidence bounds for the data set. The next step 206 may be to generate upper and lower confidence bounds for each data point in the data set 102. Upper and lower confidence bounds are calculated for each data point using each of the multiple data windows that includes the data point. With overlapping data windows, this may result in multiple confidence bounds for each data point.

The next step 208 of approach 200 may be to select the upper and lower confidence bounds for each data point, which result in the smallest mean prediction confidence interval for that data point, where the "confidence interval" is the distance between the upper and lower confidence bounds at that point. The mid-points of the resulting "best" confidence bounds may provide a smoothed estimated trend 104 for the data set 102 that can be used for prognostication and fault detection.

Figure 3:
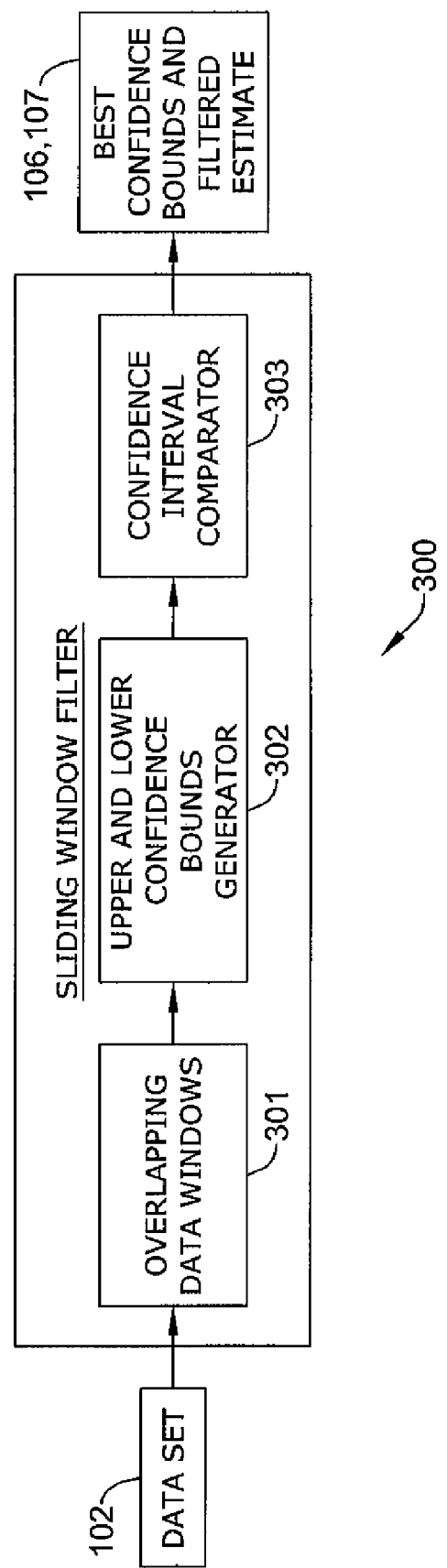
FIG. 3 is a schematic view of an exemplary sliding window filter.

Turning to FIG. 3, an example sliding window filter 300 is illustrated. The sliding window filter 300 may include a plurality of overlapping data windows 301, upper and lower confidence bounds generator 302, and a confidence interval comparator 303. The sliding window filter 300 may receive a data set 102 of data points generated by the physical system. The sliding window filter 300 may partition the data set 102 using a plurality of overlapping data windows. These data windows each may define a subset of data points in the data set 102. Each data window may include a subset of data points that comprises a contiguous sequence of ordered pairs in the data. Each subset of data defined by a window may be used to generate upper and lower confidence bounds for each data point in that window.

The amount of data in each window, or the window "size" may be selected based on a variety of factors. For example, it may be desirable to select the window length such that it is long enough to average out statistical noise and small enough such that the model parameters do not change appreciably within it. For example, the windows may be sized such that each window will include at least three points and perhaps five points to assure a valid statistical sample. In some illustrative examples, each window may have the same size as the other windows. In other illustrative examples, the window size may change as it is stepped through the data. For instance, the windowing size may be made adaptive, with larger windows in regions of little trend change and smaller windows in regions of greater trend change.

The windows may be moved through the data set 102 by stepping the windows through the data set. The size of the window step, the distance in the data set between the beginning of one window and that of the next window, may be determined by computational constraints such as the required speed of execution. However, in many cases it may be desirable to size the step such that adjacent windows overlap. Overlapping the windows may allow multiple windows to be used to calculate the upper and lower confidence bounds at each data point, and thus facilitate an improved calculation of the confidence interval.

The upper and lower confidence bounds generator 302 may take the data in each of a number of data windows 301 and generate upper and lower confidence bounds for the data in the data window. This may be done using a variety of methods and techniques. One method may be to perform a linear regression of the data in the data windows 301. Specifically, with each window of data, a linear regression may be performed to determine the confidence bounds of each data point in the window. This may be done by fitting lines to the data points within the windows. The slope and intercept of each line may be calculated to minimize the mean squared error of the line. The upper and lower confidence bounds may then be calculated by using the mean square error of the fit and the probability distribution of the residuals (e.g., the difference between the line and the data).

The upper and lower confidence bounds may be calculated using different confidence levels (often denoted by 1-α), where α is the probability that the data will be outside the confidence interval. The confidence level used for the confidence interval estimates may be chosen to trade off between precision and reliability of the interval estimates. Often, the larger the confidence level required the larger the resulting interval estimates may be.

As noted above, a variety of different linear regression techniques may be used to generate the upper and lower confidence bounds. There may be statistical inference, as with a window filter, accomplished with a variety of techniques such as Student-t statistics. A discussion of linear regression may be given, followed by a discussion of how an exemplary linear regression may be used to generate upper and lower confidence bounds.

One may consider a simple linear regression model with a single regressor:

$$y = \beta_0 + \beta_1 x + \epsilon \quad (1)$$

where the intercept $\beta_0$ and the slope $\beta_1$ are unknown constants, and $\in$ is a random error component, with zero mean and variance $\sigma^2$. Given a data set satisfying:

$$y_i = \beta_0 + \beta_1 x_i + \epsilon_i, i=1,2,\ldots,n. \quad (2)$$

the parameters $\beta_0$ and $\beta_1$ may be estimated through a method of least squares. Such an estimation may give the parameter estimates as:

$$\hat{\beta}_0 = \bar{y} - \hat{\beta}_1 \bar{x} \quad (3)$$

$$\hat{\beta}_1 = \frac{S_{xy}}{S_{xx}} \quad (4)$$

where $$\bar{y} = \frac{1}{n}\sum_{i=1}^{n} y_i \text{ and } \bar{x} = \frac{1}{n}\sum_{i=1}^{n} x_i \quad (5)$$

are the averages of $y_i$ and $x_i$ respectively, and $$S_{xx} = \sum_{i=1}^{n}(x_i - \bar{x})^2 \text{ and } S_{xy} = \sum_{i=1}^{n} y_i(x_i - \bar{x}) \quad (6)$$

Using the above parameter estimates, the estimate of mean response $E(y|x_0)$ at a point $x_0$ may be given by:

$$E(y|x_0) = \hat{\mu}_{y|x_0} = \hat{\beta}_0 + \hat{\beta}_1 x_0 \quad (7)$$

Under the assumption of normal independently distributed error, $\in_i$, the 100(1-α) percent confidence interval on the mean response at $x_0$ is:

$$\hat{\mu}_{y|x_0} - t_{\alpha/2, n-2}\sqrt{MSE\left(\frac{1}{n} + \frac{(x_0 - \bar{x})^2}{S_{xx}}\right)} \leq \quad (8)$$

$$E(y|x_0) \leq \hat{\mu}_{y|x_0} + t_{\alpha/2, n-2}\sqrt{MSE\left(\frac{1}{n} + \frac{(x_0 - \bar{x})^2}{S_{xx}}\right)}$$

where $t_{\alpha/2, n-2}$ is the inverse of the cumulative distribution (CDF) of Student's t-distribution with n-2 degrees of freedom at α/2 and MSE is an estimate of the noise variance and is equal to the mean square error in the residuals as defined by:

$$MSE = \frac{\sum_{i=1}^{n}(y_i - \hat{y}_i)^2}{n - 2} \quad (9)$$

and where $\hat{y}_i = \hat{\beta}_0 + \hat{\beta}_1 x_i$. The 100(1-α) percent confi for a future observation $y_f$ at $x_f$ may be given by $$\hat{y}_f - t_{\alpha/2, n-2}\sqrt{MSE\left(1 + \frac{1}{n} + \frac{(x_f - \bar{x})^2}{S_{xx}}\right)} \leq \quad (10)$$

$$y_f \leq \hat{y}_f + t_{\alpha/2, n-2}\sqrt{MSE\left(1 + \frac{1}{n} + \frac{(x_f - \bar{x})^2}{S_{xx}}\right)}$$

and where $\hat{y}_f = \hat{\beta}_0 + \hat{\beta}_1 x_f$. Equations 8 and 10 may define up and lower confidence bounds for mean prediction and single prediction, respectively. The mean prediction defined by equation 8 may provide the confidence intervals for the filtered expected values of the data, the estimated values of the actual data with the noise removed. The single prediction defined by equation 8 may provide the confidence intervals for the estimated actual expected values, with the noise included. Equations 8 and 10 may thus provide two mechanisms for generating confidence intervals from the data set.

Again, the confidence level α may define the probability of confidence that the actual values will lie within the confidence interval defined by the upper and lower confidence bounds.

The confidence level α for the interval estimates may thus be chosen to trade off between precision and reliability of the interval estimates. Specifically, a small confidence level α may result in a wide interval in equations 8 and 10 with a 1−α probability of the mean or predicted response lying between the limits. Conversely, a larger confidence level α may result in tighter confidence intervals and lower probability of the prediction lying between the bounds.

To describe a specific technique, the upper and lower confidence bounds generator 302 may determine the bounds by fitting lines to the data for each of the overlapping data windows 301. To do this, the slope $\hat{\beta}_{1,k}$ and intercept $\hat{\beta}_{0,k}$ may be estimated from equations 3 and 4 for each window k. Intervals of mean prediction and single prediction may then be estimated using equations 8 and 10, respectively. Performing this calculation with multiple overlapping data windows 301 may result in multiple interval estimates for every point.

As stated above, using multiple overlapping data windows 301 may result in multiple upper and lower confidence bounds for every point. These confidence intervals may then be passed to the confidence interval comparator 303 to determine the upper and lower confidence bounds for each data point that results in the smallest mean prediction confidence interval for that data point. This may result in a smoothed estimated trend for the data set that can be used for prognostication and fault detection.

The minimum confidence interval may be determined by:

$$I^{opt}_{i,k^*} = \min_k \left\{ 2 t_{\alpha/2, n_k - 2} \sqrt{MSE_k \left( \frac{1}{n_k} + \frac{(x_i - \bar{x}_k)^2}{S_{xx,k}} \right)} \right\} \quad (11)$$

where $I^{opt}_{1,k}*$ is the minimum width interval corresponding to k=k*, $n_k$ is the number of data points inside window k, and the subscript k refers to the calculations made from the linear regression of data in window k. The smoothed estimate of the data set trend may be taken as the estimate of:

$$\hat{y}_{i,k} = \hat{\beta}_{1,k}* x_i + \hat{\beta}_{0,k}* \quad (12)$$

corresponding to $I^{opt}_{i,k}*$, and thus the minimal confidence interval may correspond to the prediction made from window k*. The sliding window filter 300 may thus provide a smoothed estimate of a data set 102 by partitioning the data set using a multiplicity of data windows 301, calculating the upper confidence bounds and lower confidence bounds for each data point using each of the multiple data windows that includes the data point, and selecting the "best" upper confidence bounds and the lower confidence bounds that results in the smallest mean prediction confidence interval for that data point. The mid-points of the selected bounds may provide a smoothed filtered estimate for the data set 102 can then be used for prognostication and fault detection.

It can be noted that the specific approach outlined above may be suboptimal in the sense that it is not required that the minimum possible confidence interval widths or minimum mean squared error be obtained. This is because it would generally not be desirable to perform the minimization using all possible data windows, but only with a subset of windows determined by computational capacity and time constraints. Moreover, even in the absence of a detailed model of the underlying physical process, the system may still avoid the imposition of an arbitrary model structure upon the data to perform smoothing and prediction. The only assumption is that of local linearity. The approach also does not need covariances of process and measurement noise. In contrast, a Kalman filter may typically require a detailed model and knowledge of noise covariances.

Figure 4:
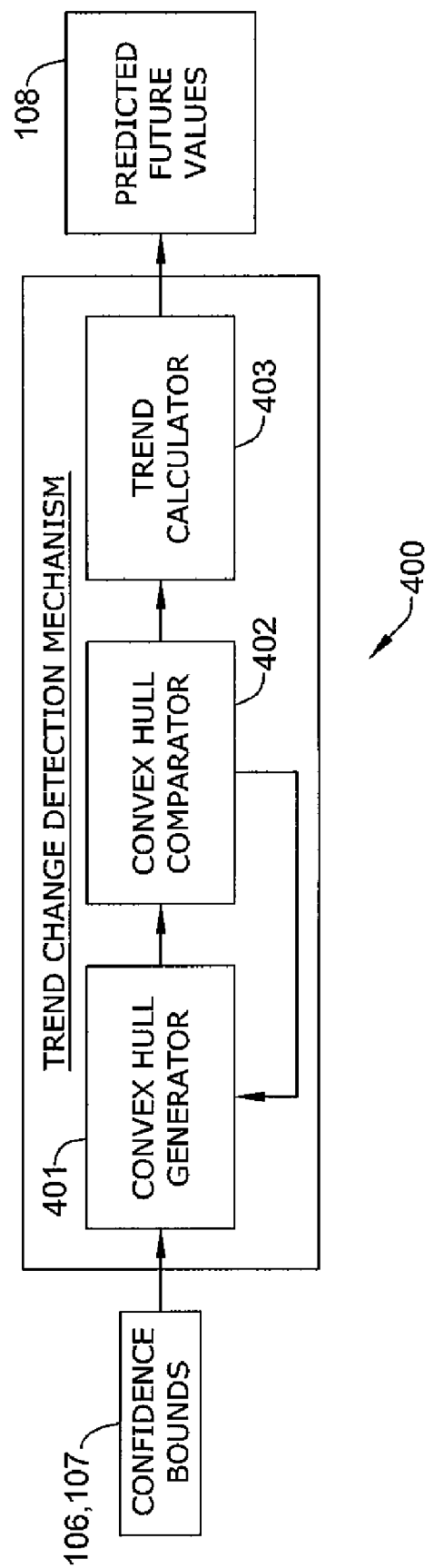
FIG. 4 is a schematic view of an exemplary trend change detection mechanism.

Turning to FIG. 4, an exemplary trend change detection mechanism 400 is illustrated schematically. The trend change detection mechanism 400 might be exemplary of the type of mechanism that can be used in the trending system and related method. The trend change detection mechanism 400 may include a convex hull generator 401, a convex hull comparator 402 and a trend calculator 403. In general, the trend change detection mechanism 400 may determine a first convex hull for the upper confidence bounds 106 and a second convex hull for the lower confidence bounds 107 using the convex hull generator 401. The trend change detection mechanism 400 may compare the first convex hull and the second convex hull to determine a transition point in the data set using the convex hull comparator 402. The data points in the data set whose abscissae are greater than or equal to the transition point abscissa may be used for future prediction via linear regression.

As the term is used in this application, a convex hull of a finite and bounded set of points may be defined as the intersection of all of the convex sets containing the set of points. The trend change detection mechanism 400 is based upon the idea that the convex hulls of the upper 106 and lower 107 confidence bounds of a mean prediction intersect when the deviation of the trend from linearity is large enough to be perceptible above the noise extant in data. The intersection of the convex hulls of the upper 106 and lower 107 confidence bounds may contradict the assumption of linearity in the trend, and thus be used to detect deviations from linearity.

The convex hull generator 401 may receive the confidence bounds for a data set 102. The confidence bounds 106, 107 may be calculated using the techniques described above with reference to the sliding window filter 300 or other suitable approaches.

From the confidence bounds 106, 107, the convex hull generator 401 may determine the convex hulls of the upper and lower confidence bounds. This may be done using any suitable technique, such as the variety of standard algorithms that are commercially available. One such technique may be a triangulation approach that is utilized by the standard MATLAB function convhull.

The convex hull generator 401 may pass the computed convex hulls to the convex hull comparator 402. The convex hull comparator 402 may determine if the convex hulls for the upper 106 and lower 107 confidence bounds intersect at any point. This determination may be made using one of several possible approaches, such as checking to determine if any point in the convex hull of the lower bounds lies within the convex hull of the upper bounds. An intersection of the convex hulls may imply either that a point on the line segment joining two of the upper confidence bounds 106 lies below one of the lower confidence bounds 107, or that a point on the line segment joining two of the lower confidence bounds lies above one of the upper confidence bounds. Thus, an intersection in the convex hulls may imply that a trend change exists in the portion of the data set that was the source data for the upper and lower confidence bounds.

Thus, if the convex hulls for the upper 106 and lower 107 confidence bounds intersect, the points in the data set and corresponding confidence bounds prior to the intersection may be removed, and the convex hull generator 402 may again calculate the convex hulls for the remaining upper and lower confidence bounds 106, 107. The convex hull comparator 402 may then compare the newly calculated convex hulls to determine if an intersection still exists. This iterative process may be continued until a modified data set is found that results in non-intersecting convex hulls.

When a data set 102 is found that results in non-intersecting convex hulls, the trend calculator 403 may determine predicted future values 108 of the data set 102 using the last trend in the data. As one example, a least squares fit line may be drawn through all the remaining data points to determine the trend of predicted future values. This may also be used to calculate future confidence interval estimates, such as interval estimates of mean prediction and/or future single prediction as may be needed.

This approach may have several important resulting properties, including those that arise as a result of the statistical nature of data, and those that arise from assuming linear underlying trends. Under the first category, there may be an issue in detecting trend changes smaller than the variance when our sample sizes in the sample windows are small. Specifically, the method might not precisely distinguish the points where trends change, but only in some region around them. Under the second category, slow continuous trend changes that appear might not be distinguished as they are locally linear and change cumulatively. Thus, a continuous trend change may be broken into several linear pieces and possibly reduce the extent to which the data can be extrapolated.

The approach further may supply clear information as to when greater frequency of data collection is needed, as infrequent collection of data leads to wide interval estimates for future prediction. The approach may also be used to determine when there is insufficient data to reasonably extrapolate from data available up to the current time. This may occur when a trend change is detected very near the end of the available data, and there are few points from which to extrapolate into the future. If the confidence intervals of future prediction from the last detected trend are extremely wide, then the probability of the data ordinate reaching a certain value between certain future times may be very small, and it may be desirable to wait for more data to establish a trend.

Figure 5:
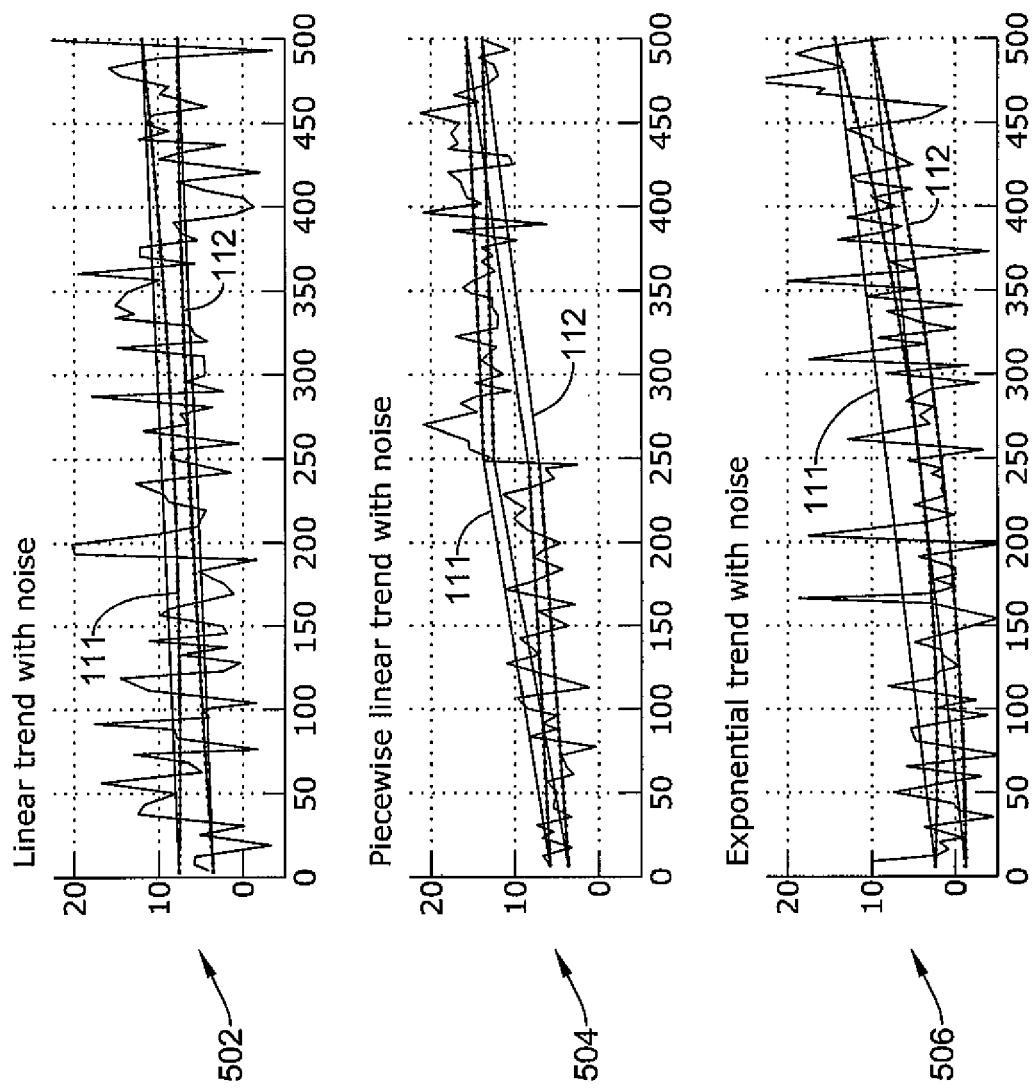
FIG. 5 is three graphical examples of convex hulls of mean prediction.

Turning to FIG. 5, three graphical examples of convex hulls of mean prediction bounds (as calculated using equation 8) for data with additive noise are illustrated. Specifically, FIG. 5 includes a top plot 502, a middle plot 504 and a bottom plot 506. Each plot shows a set of noisy data with a different underlying trend. Each plot also illustrates the convex hulls that are generated after filtering using a sliding window filter 300 to remove the effects of the noise as noted above. The top plot 502 illustrates upper and lower convex hulls where the underlying trend of the data (with the noise removed) is a continuous straight line. Likewise, the middle plot 504 illustrates upper and lower convex hulls where the underlying trend of the data (with the noise removed) is a piecewise continuous line with a jump at x=250. Finally, the bottom plot 506 illustrates upper and lower convex hulls where the underlying trend of the data (with the noise removed) is an exponential curve.

In the top plot 502, the upper 111 and lower 112 convex hulls do not intersect because for a line, the upper confidence limits are above the line and the lower confidence limits are below it. However, in the middle plot 504 the convex hulls 111, 112 intersect since there are two lines, the second above the first. Similarly, in the bottom plot 506, the convex hulls 111, 112 of the confidence bounds of the exponential intersect as the slope of the curve changes significantly within the sample considered. It should be noted that if the noise were higher, or if the confidence levels were set higher, the convex hulls might not intersect. The intersection points of the convex hulls 111, 112 may be used to determine a transition point in the data set as described above. With any transition point determined, the trend change detection mechanism may determine a likely future trend for the data set based on the transition point and the points in the data after the transition point.

Figure 6:
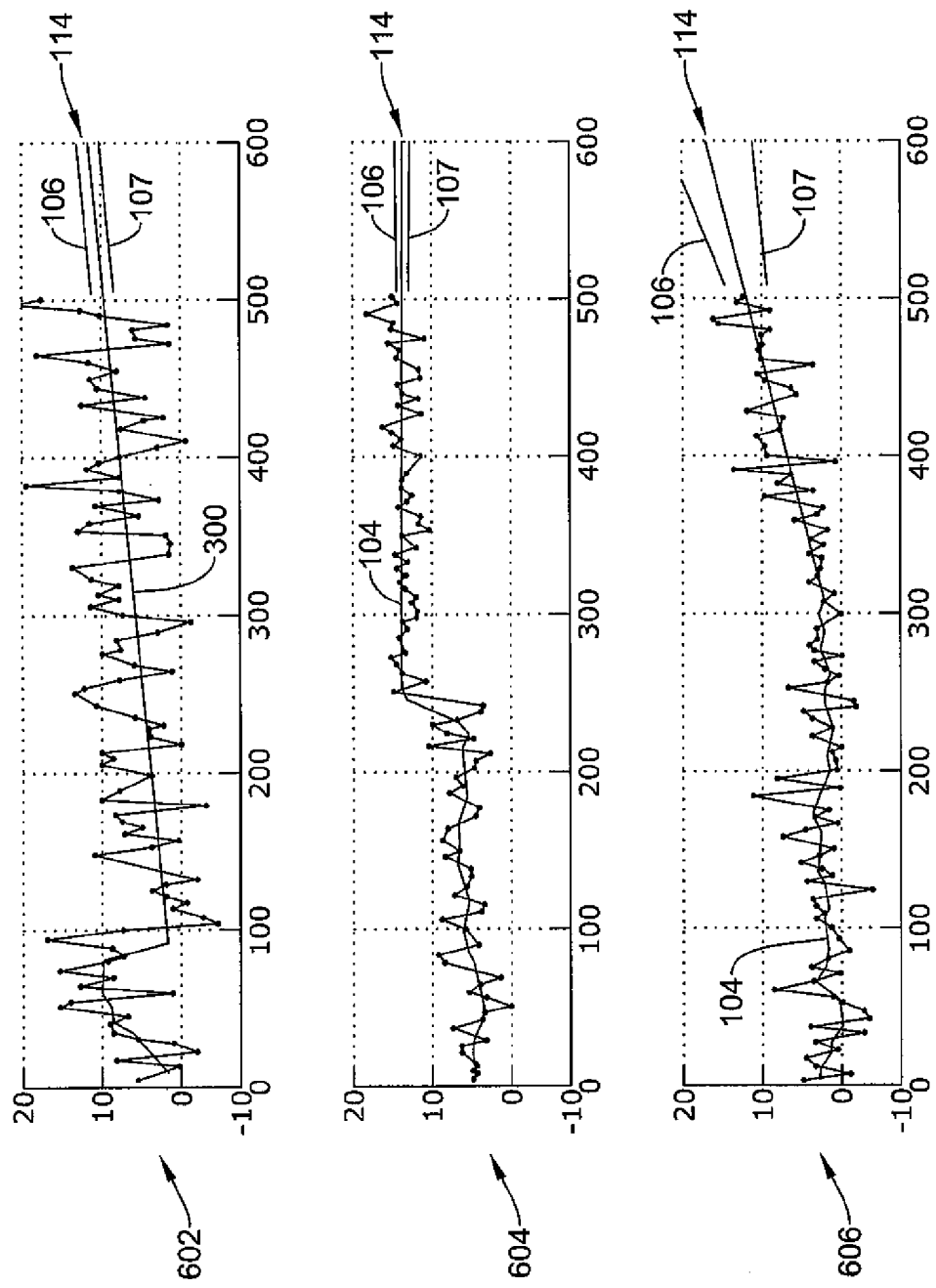
FIG. 6 is three graphical examples of smoothing and trend prediction.

Turning to FIG. 6, three graphical examples of smoothing and trend prediction are shown. Specifically, FIG. 6 includes a top plot 602, a middle plot 604 and a bottom plot 606. Again, each plot shows a set of noisy data with a different underlying trend, illustrated as a set of points connected by lines. Each plot also illustrates a smoothed estimated trend that can be generated from noisy data using a sliding window filter 300 as noted above. Finally, each plot shows upper 106 and lower 107 confidence bounds which may be used to predict future values of the data set 102. The top plot 602 illustrates smoothed filtered estimate and confidence bounds 106, 107 for future prediction where the underlying trend 104 of the data (with the noise removed) is a continuous straight line. Likewise, the middle plot 604 illustrates the smoothed filtered estimate and confidence bounds 106, 107 for future prediction where the underlying trend 104 of the data (with the noise removed) is a piecewise continuous line with a jump at x=250. The bottom plot 606 illustrates the smoothed filtered estimate and confidence bounds 106, 107 for future prediction where the underlying trend of 104 the data (with the noise removed) is an exponential curve.

The plots 602, 604, 606 may show how the sliding window filter 300 can identify different smoothed trends 104 within the data depending upon the parameters used, the variance in the data and the size of the sample. These trends may be distorted by the presence of statistical outliers, which can be removed as discussed below. The trend change in the middle plot may be only approximately detected. Finally, the prediction for nonlinear curves may result in wider confidence bounds 106, 107. This may be seen in the prognostic from the exponential curve in the bottom plot. This is because the change in trend may necessitate the use of only a relatively small part of the data for prediction, the part after which the convex hulls of upper 106 and lower 107 confidence bounds do not intersect.

Figure 7:
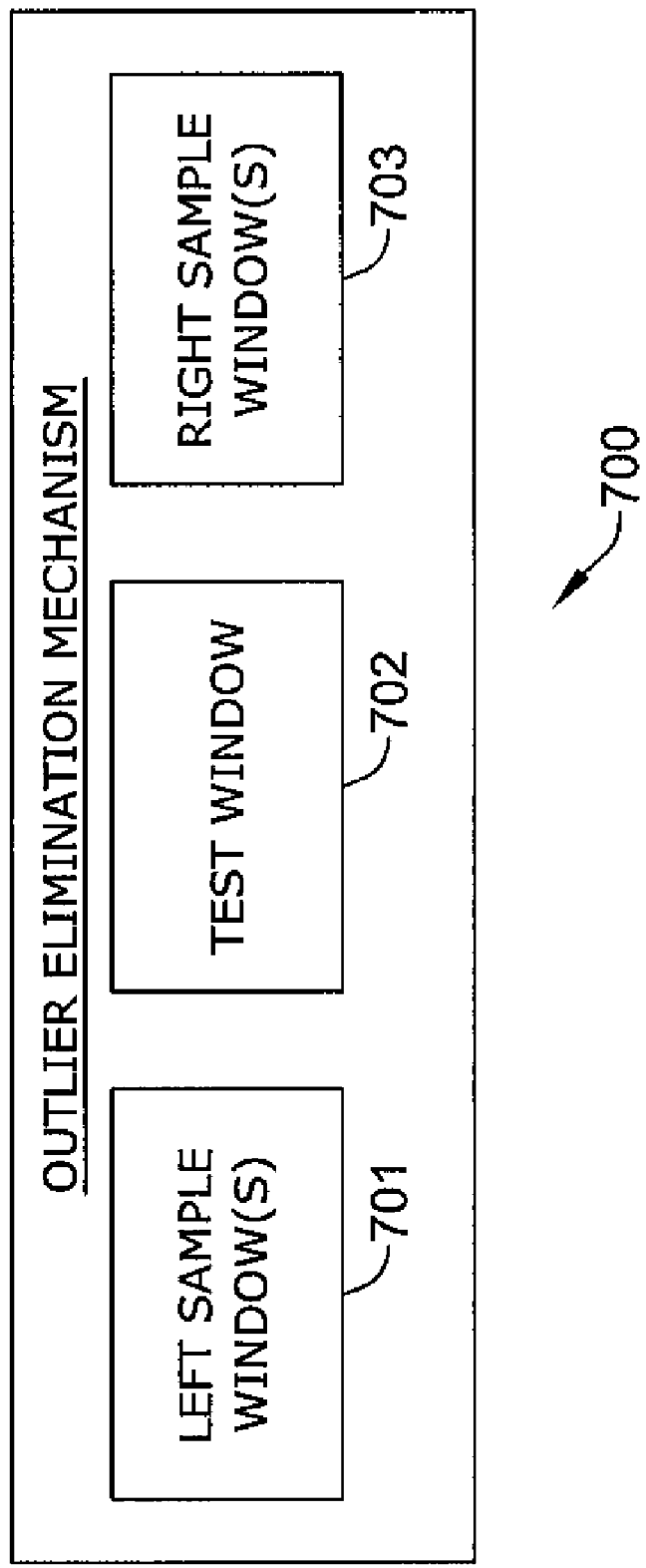
FIG. 7 is a schematic view of an exemplary outlier elimination mechanism.

Turning to FIG. 7, an outlier elimination mechanism 700 is illustrated schematically. The outlier elimination mechanism 700 may be an example of the type of mechanism that can be used in the trending system. The outlier elimination mechanism 700 may include left sample windows 701, right sample windows 703 and test windows 702 to determine which, if any data points in the data set 102 are statistical outliers. Statistical outliers may be those points which can be assumed to be corrupted because they are outside the appropriate confidence intervals at that point. The outlier elimination mechanism 700 may generate a first prediction cone from data points in the left sample window 701, and generate a second prediction cone from data points in the right sample window 703. The outlier elimination mechanism 700 may then determine if data points in the test window 702 reside in the first prediction cone and the second prediction cone. If a data point in the test window 702 does not reside in either the first prediction cone or the second prediction cone, then it may be considered a statistical outlier and removed prior to trending the data set.

The outlier elimination mechanism 700 may be applied to data before it is trended using the sliding window filter 300 and/or trend change detection mechanism 400. Removing statistical outliers by using the mechanism prior to trending may result in improved accuracy for the final estimated trend output.

As indicated above, the outlier elimination mechanism 700 may include a left sample window 701, a right sample window 703, and a test window 702. These data windows 701, 702, 703 may be "stepped" together through the data in the set 102, and an outlier elimination calculation may be performed at each step. Stepping the data windows through the data set may facilitate the location of statistical outliers throughout the complete data set. Furthermore, selecting a step size that results in overlapping the data windows 701, 702, 703, may facilitate multiple calculations for each data point and thus be used to improve the accuracy of the system. The size of the test window 702 may be selected to ensure that at least one data point exists in the test window 702 at each window location. Often, a larger window may result in faster execution.

As noted above, the outlier elimination mechanism 700 may generate a first prediction cone from data points in the left sample window 701, and generate a second prediction cone from data points in the right sample window 703. This may be done by fitting a linear regression line to the data in the left sample window 701 and fitting another linear regression line to the data in the right sample window 703 at every window step. The resulting linear regression lines may be used to make prediction cones at a specified level of confidence. Specifically, the prediction cone may be a set of single prediction confidence intervals for the data points in the test window 702 as generated by the data in the left 701 and right 703 sampling windows. The prediction cones may then be compared with the data points in the test window 702. If a data point does not fall within the prediction cone for either the left 701 or right 703 sample windows, the data point may be assumed to be a statistical outlier. If the data point is within either prediction cone, then it may be assumed to not be a statistical outlier.

To improve the accuracy of the method, the outlier elimination calculation may be performed using several overlapping left 701 and right 703 sample windows, and the outlier determination done by combining the results of the overlapping windows. The outlier calculations may be combined by voting using a variety of different weighting techniques. As two specific examples, the results may be combined by using the reciprocal of the interval estimates produced by the window, or they may be combined unweighted using a simple majority.

Figure 8:
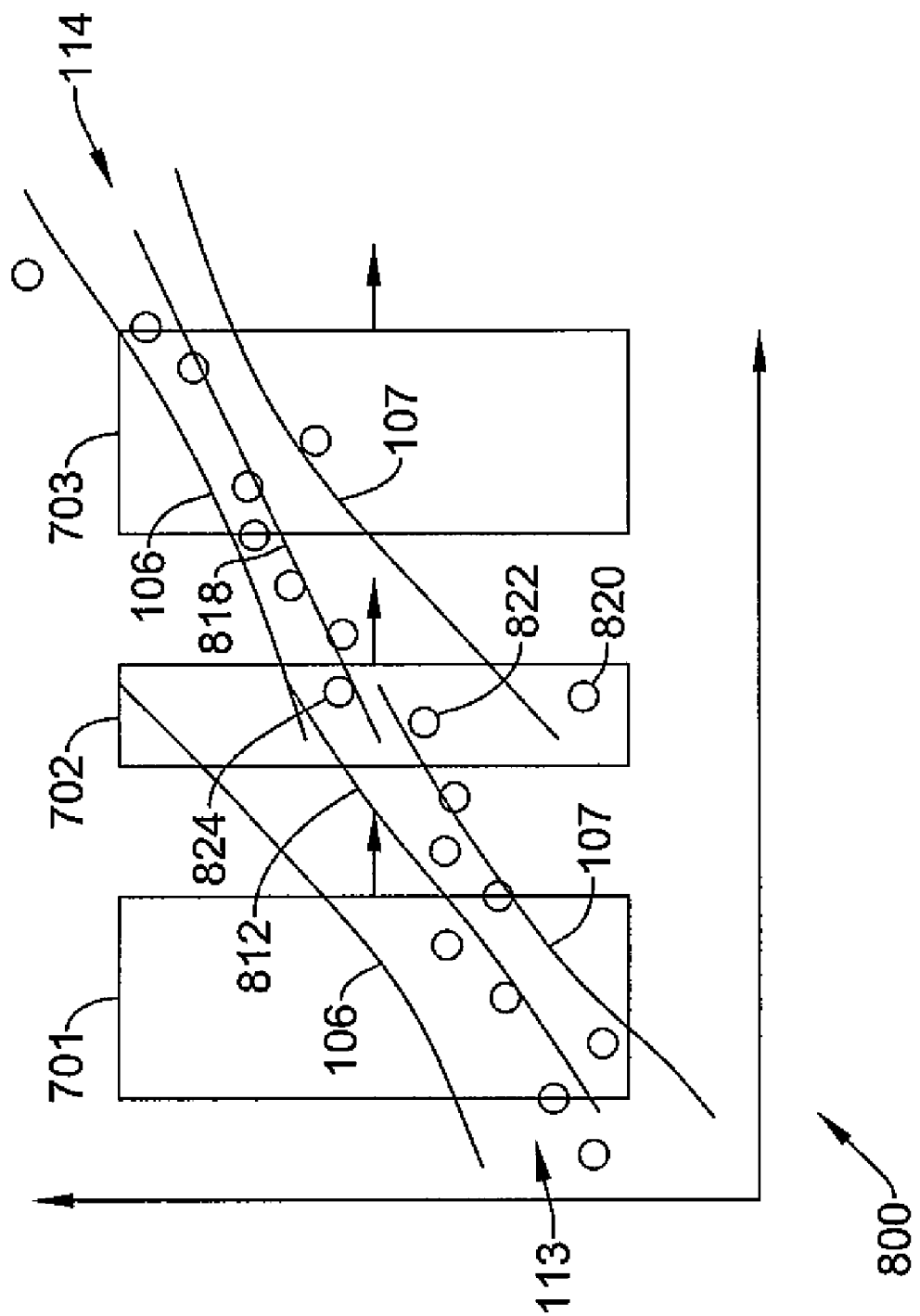
FIG. 8 is a graphical example of left sample window, right sample window and test window with sample data.

Turning to FIG. 8, a graphical example 800 of a left sample window 701, a test window 702 and a right sample window 703 are shown. The windows 701, 702, and 703 may be "stepped" together through the data in the set 102, and an outlier elimination calculation may be performed at each step. Specifically, at each step a first prediction cone may be generated from data points in the left sample window 701 and a second prediction cone may be generated from data points in the right sample window 703. In FIG. 8, a linear regression line 812 of the data in the left sample window 701 may be used to generate a first prediction cone 113 comprising upper confidence bounds 106 and lower confidence bounds 107. Likewise, a linear regression line 818 of the data in the right sample window 703 may be used to generate a second prediction cone 114 comprising upper confidence bounds 106 and lower confidence bounds 107. The resulting prediction cones may be used to determine if data in the test window 702 include any statistical outliers. In the example 800, the data point 820 appears outside the prediction cones 113 and 114 for both the left 701 and right 703 sample windows, respectively, and thus can be may be assumed to be a statistical outlier. Conversely, data points 822 and 824 in the test window 702 appear both inside at least one prediction cone 113 or 114, and thus may be assumed to not be statistical outliers.

An example of an outlier elimination may be given. Here, the confidence intervals of single prediction of the left 701 and right 703 sample windows for data points in the test window 702 may be calculated as follows:

$$I_i = [\hat{y}_i - t_{\alpha/2, n-2} s_{y_i}, \hat{y}_i + t_{\alpha/2, n-2} s_{y_i}] \quad (13)$$

where $$\hat{y}_i = \hat{m} t_i + \hat{\mu} \quad (14)$$

and $t_i$ denotes the time of collection of data ordinate $y_i$. And where $$s_{y_i}^2 = MSE\left[1 + \frac{1}{n} + \frac{(t_i - \bar{t})^2}{\sum_{j=1}^{n}(t_j - \bar{t})^2}\right] \quad (15)$$

$$MSE = \frac{\sum_{j=1}^{n}(y_j - \bar{y})^2}{n-2} \quad (16)$$

$$\bar{t} = \frac{1}{n}\sum_{j=1}^{n} t_j; \quad \bar{y} = \frac{1}{n}\sum_{j=1}^{n} y_j; \quad (17)$$

and where $\hat{m}$ and $\hat{\mu}$ may be obtained through the least squares fit to data points in the sample window, $t_{\alpha/2, n-2}$ is the inverse function of the cumulative distribution function of Student's t-distribution with n−2 degrees of freedom evaluated at $\alpha/2$ and n is the number of data points in the sample window.

The votes $V_{ik,L/R}$ of the left 701/right 703 windows may be summed in the following manner:

$$V_{i,L} = \sum_{k=1}^{N_{win}} V_{ik,L}; \quad V_{i,R} = \sum_{k=1}^{N_{win}} V_{ik,R} \quad (18)$$

where, the votes may be calculated according to:

$$V_{i,L/R} = \begin{cases} \frac{1}{2 t_{\alpha/2, n-2} s_{\hat{y}_i}} & \text{if } y_i \in [\hat{y}_i - t_{\alpha/2, n-2} s_{y_i}, \hat{y}_i + t_{\alpha/2, n-2} s_{y_i}] \\ \frac{-1}{2 t_{\alpha/2, n-2} s_{y_i}} & \text{if } y_i \notin [\hat{y}_i - t_{\alpha/2, n-2} s_{y_i}, \hat{y}_i + t_{\alpha/2, n-2} s_{y_i}] \end{cases} \quad (19)$$

If after calculating the votes, the voting sums $V_{i,L} < 0$ and $V_{i,R} < 0$, the data point may be marked as an outlier. If $V_{i,L} < 0$ and $V_{i,R} > 0$, then this data point may mark the beginning of a new trend. If $V_{i,L} > 0$ and $V_{i,R} < 0$, the next point may be marked as the beginning of a new trend. If $t_i - t_{i-1} > L_w$ (i.e., there may be a large gap in data collection), the point may be marked with a new trend number. Data prior to the gap may be eliminated for the purpose of trending. Finally, if there are too few points in the sample window, the sample window is not used for regression or interval estimation.

The outlier elimination mechanism 700 thus may use the left sample 701, right sample 703 and test window 702 to determine which, if any data points in the data set 102 are statistical outliers. The outlier elimination mechanism 700 may then determine if data points in the test window 702 reside in the first prediction cone 113 generated by the left sample window 701 and the second prediction cone 114 generated by the right sample window 703. If a data point, e.g., data point 820, in the test window 702 does not reside in either the first prediction cone 113 or the second prediction cone 114, then it may be considered a statistical outlier and removed prior to trending the data set 102.

Figure 9:
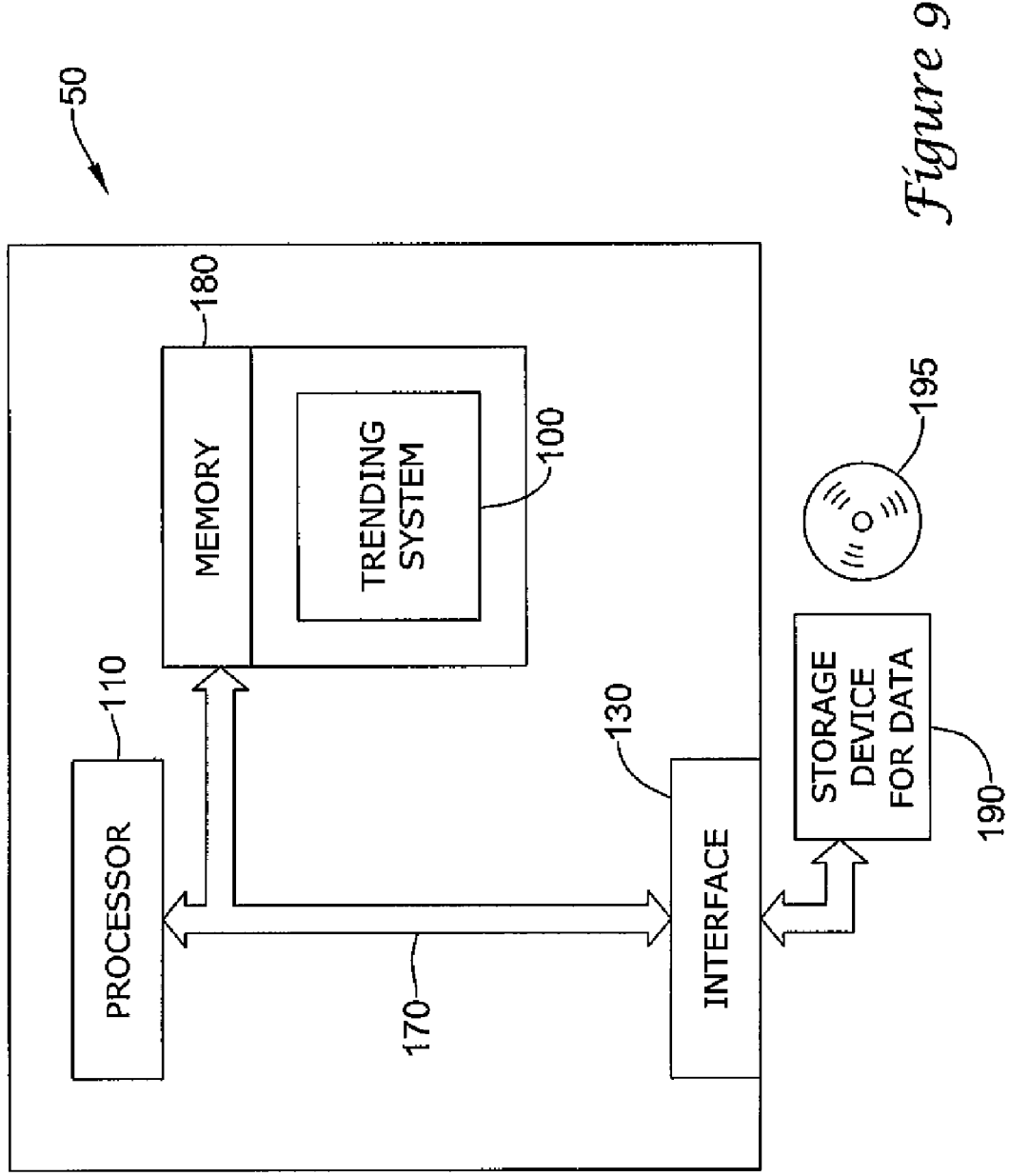
FIG. 9 is a schematic view of an illustrative computer system.

The trending system 100 may be implemented in a wide variety of platforms. Turning to FIG. 9, an exemplary computer system 50 is illustrated. Computer system 50 shows the general features of a computer that may be used to implement the invention. Of course, these features are merely exemplary, and it should be understood that the invention may be implemented using different types of hardware that can include more or different features. It should be noted that the computer system 50 may be implemented in many different environments, such as in a clock system, to provide onboard prognostics, or on the ground to provide offline prognostics. The computer system 50 may include a processor 110, an interface 130, a storage device 190 for physical system data, a bus 170 and a memory 180. The memory system 180 may include a trending program. As described above, the trending system 100 may include a sliding window filter 300, a trend change detection mechanism 400, and an outlier elimination mechanism 700.

The processor 110 may perform the computation and control functions of the computer system 50. The processor 110 may have any type of processor, include single integrated circuits such as a microprocessor, or may have any suitable number of integrated circuit devices and/or circuit boards working in cooperation to accomplish the functions of a processing unit. In addition, processor 110 may have multiple processors implemented on separate systems. In addition, the processor 110 may be part of the clock system or of an overall vehicle control, navigation, avionics, communication, prognostic, diagnostic or sensor system that includes the clock system.

There may be two processors where one is trending the clock of the other. For instance, there may be trending of the sensor or leaf node 852 clock using the infrastructure node 851 clock of a wireless system 850 in FIG. 10. Generally, trending done by a process involves using the better clock to do trending of the poorer or cheaper clock. During operation, the processor 110 may execute programs involving the trending system 100, contained within memory 180, and as such, may control the general operation of the computer system 50.

Memory 180 may be any type of suitable memory. This may include the various types of dynamic random access memory (DRAM) such as SDRAM, the various types of static RAM (SRAM), and the various types of non-volatile memory (PROM, EPROM, and flash). Memory 180 may be a single type of memory component, or it may be composed of many different types of memory components. In addition, the memory 180 and the processor 110 may be distributed across several different computers that collectively include or are a part of computer system 50. For example, a portion of memory 180 may reside on the clock system computer, and another portion may reside on a ground based diagnostic computer.

The bus 170 may serve to transmit programs, data, status and other information or signals between the various components of system 100 (FIG. 1). The bus 170 may be any suitable physical or logical means of connecting computer systems and components. This may include, but not be limited to, direct hard-wired connections, fiber optics, infrared and wireless bus technologies.

The interface 130 may allow communication to the system 50, and be implemented using any suitable method and apparatus. It may include a network interfaces to communicate to other systems, terminal interfaces to communicate with technicians, and storage interfaces to connect to storage apparatuses such as storage device 190. Storage device 190 may be any suitable type of storage apparatus, including direct access storage devices such as memory cards, hard disk drives, flash systems, floppy disk drives and optical disk drives. As shown in FIG. 9, storage device 190 may comprise a disc drive device that uses discs 195 to store data.

The computer system 50 may include trending system 100. Specifically during operation, the trending system 100 may be stored in memory 180 and executed by processor 110. When being executed by the processor 110, the trending system 100 may receive data sets 102 and filters and determine estimated trends of the data sets. These data sets may include clock system data. The data sets may be from sensors or leaf nodes 852 having their own clocks which are transmitted to infrastructure nodes 851 where the sensor or leaf node clocks are trended. The infrastructure nodes 851 generally have the better clocks and processors for trending calculations. The estimated trends may be then used by a technician, operator or other user to interact with the system in order to arrive at proper diagnostics and prognostics.

While the present invention may be in the context of computer system 50, mechanisms of the present invention may be distributed as a product in a variety of forms, and that the present invention may apply equally regardless of the particular type of signal bearing media used to carry out the distribution. Examples of signal bearing media may include recordable media such as floppy disks, hard drives, memory cards and optical disks (e.g., disk 195), and transmission media such as digital and analog communication links, including wireless communication links.

As one example implementation, the trending system may operate on data that is acquired from the physical system (e.g., clock system) and periodically be uploaded to an internet website. The trending analysis may be performed by the web site and the results returned back to the technician, operator or other user. Thus, the system may be implemented as part of a web-based diagnostic and prognostic system.

Figure 10:
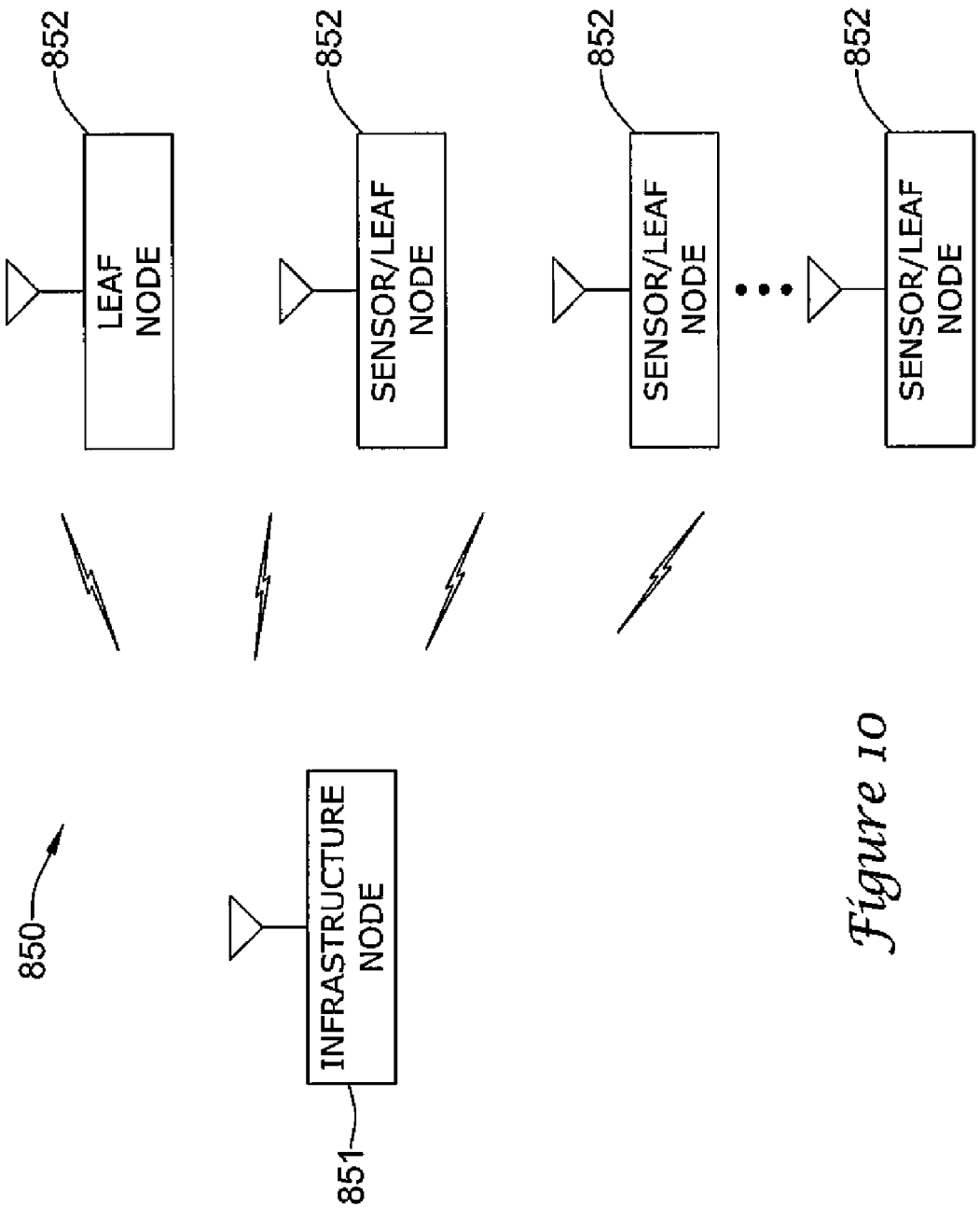
FIG. 10 is a block diagram of an exemplary wireless network.
Figure 11:
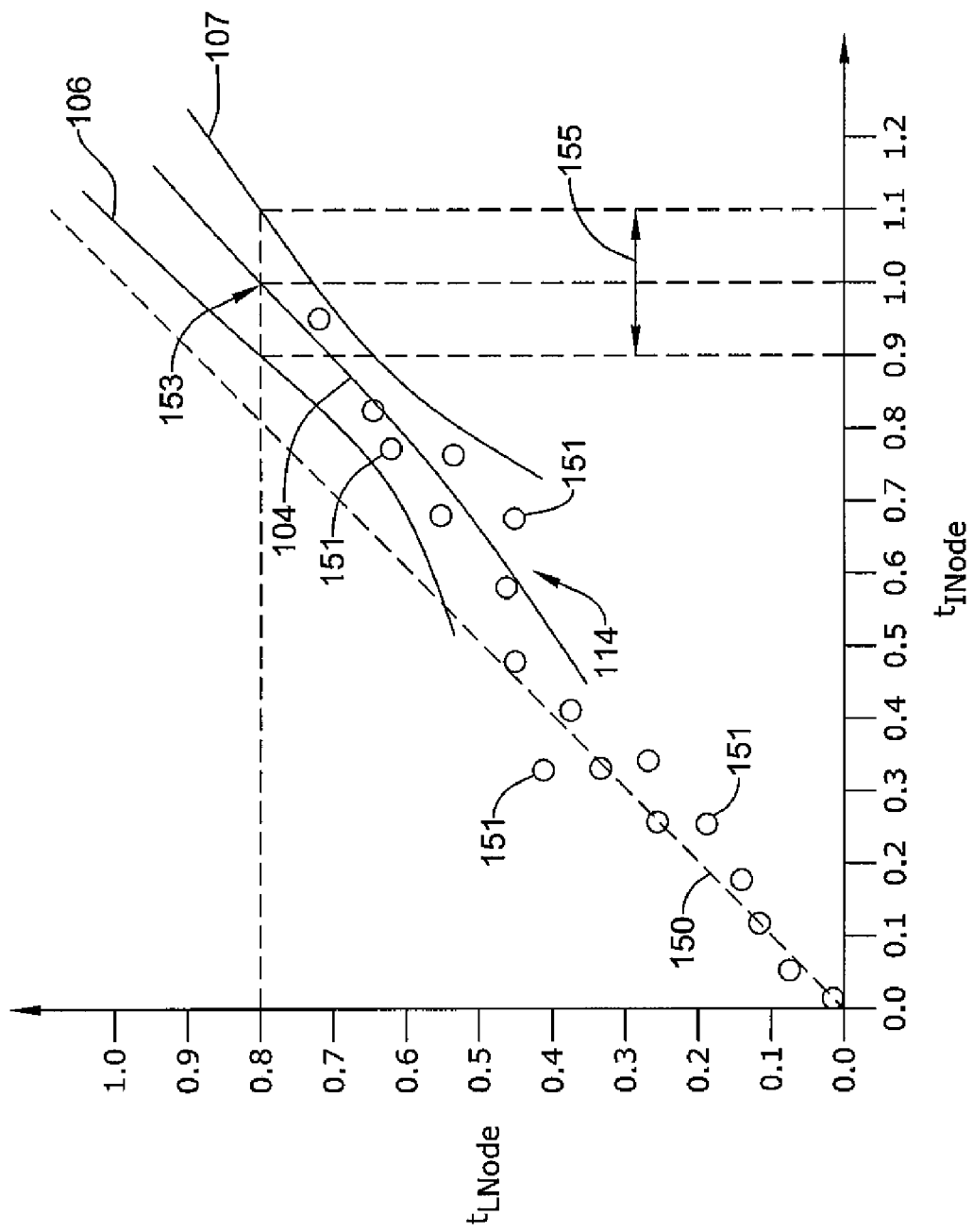
FIG. 11 is a graphical representation of a clock drift prediction.

FIG. 11 is a graph that shows data points (i.e., small circles) of the time ($t_{LNode}$) on the ordinate axis of a clock of a sensor/leaf node (leaf node) 852 relative to the time ($t_{INode}$) on the abscissa axis of a clock of the infrastructure node 851 of system 850 (FIG. 10). Each axis is divided into tenths of units which may represent the same units of time for both axes. The latter clock may be regarded as a system clock having a reference time ($t_{INode}$). The clock of the sensor/leaf node 852 may be regarded and an independent clock having a time ($t_{LNode}$) that may drift relative to the reference time. One goal is to determine the trend of the drift, if any, of the leaf node clock relative to the system clock of the infrastructure node. In the case of drift, the infrastructure node 851 may adjust its listening schedule and/or transmission schedule so that it can accurately predict when the leaf node 852 is going to transmit or listen. This adjustment as needed may permit the leaf node to save battery life in that the infrastructure node will know when to tune in or listen for messages from the leaf node 852. Further, the infrastructure node 851 will know when to transmit messages so as to conform to the listening schedule of the leaf node 852, since the leaf node 851 may be able to extend the time of its battery life by having its transmitter and receiver on only when needed. This may not be possible if the infrastructure node had little or no idea about the time on the clock of the leaf node 852. This knowledge by the infrastructure node 851 about the clock of the leaf node 852 may reduce the amount of time spent by the infrastructure node 851 unnecessarily transmitting messages to and waiting for messages from the leaf node 852.

If the clock of the leaf node 852 has the same time as that of the clock of the infrastructure node 851, then data points of $t_{LNode}$ would lie on the dashed line 150 in the graph of FIG. 11. However, the graph shows a variation between the two clocks (i.e., $t_{LNode}$ and $t_{INode}$) as may be shown by some the data points 151 not lying on line 150. Linear regression or trend line 104 of the data 151 may generate a prediction cone 114 having upper 106 and lower 107 confidence bounds. Trend line 104 may indicate what the time ($t_{INode}$) on the system clock should be for a given time ($t_{LNode}$) on the sensor or leaf node clock. If the leaf node is to send a message at time 0.8, that would occur at time 1.0 on the INode clock at point 153. The INode may start listening for the LNode message from for a period from time 0.9 to time 1.1 on the INode clock, as shown by duration 155.

Although the present invention has been described in one example as a trending system for trending clock system performance, the present invention may also be applied to other physical systems in general and other clock systems in particular. Examples of the types of clock systems that the present invention can be applied to include those in various control systems, sensor systems, communications systems, security systems, and nuclear, biological, chemical (NBC) detection systems.

In the present specification, some of the matter may be of a hypothetical or prophetic nature although stated in another manner or tense.

Further, although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A trending system comprising:
a sliding window filter; and
wherein:
the sliding window filter receives a data set from a clock system;
the data set comprises a plurality of data points;
the sliding window filter selects multiple data windows in the data set;
each of the data windows includes a subset plurality of the data points in the data set;
the sliding window filter generates upper confidence bounds and lower confidence bounds for each data point through regression and interval estimation over each of the multiple data windows that includes the data point;
the sliding window filter compares the interval widths of the confidence intervals produced by regression over each of the multiple data windows that includes the data point;
the sliding window filter selects a fit for each data point that results in the smallest confidence interval for that data point; and
the sliding window filter generates a filtered estimate of the data set from the selected upper confidence bounds and lower confidence bounds for each data point; and
a trend change detection mechanism, wherein:
the trend change detection mechanism determines a first convex hull for a set of upper confidence bounds and a second convex hull for a set of lower confidence bounds;
a comparator mechanism compares the first convex hull and the second convex hull to determine a transition point in the data set; and
an estimated trend of the data set is determined from the transition point and data after the transition point.

2. The system of claim 1, wherein the trend change detection mechanism compares the first convex hull to the second convex hull by determining if the first convex hull and the second convex hull intersect.

3. The system of claim 1, wherein the trend change detection mechanism compares the first convex hull and the second convex hull to determine a transition point in the data stream by determining if the first convex hull and the second convex hull intersect, and by iteratively discarding past points in the data set and generating a new first convex hull and a new second convex hull until there is no intersection between the new first convex hull and the new second convex hull.

4. The system of claim 1, wherein adjacent windows in the multiple data windows overlap in the data set.

5. A trending system comprising:
a sliding window filter; and
wherein:
the sliding window filter receives a data set from a clock system;
the data set comprises a plurality of data points;
the sliding window filter selects multiple data windows in the data set;
each of the data windows includes a subset plurality of the data points in the data set;
the sliding window filter generates upper confidence bounds and lower confidence bounds for each data point through regression and interval estimation over each of the multiple data windows that includes the data point;
the sliding window filter compares the interval widths of the confidence intervals produced by regression over each of the multiple data windows that includes the data point;
the sliding window filter selects a fit for each data point that results in the smallest confidence interval for that data point;
the sliding window filter generates a filtered estimate of the data set from the selected upper confidence bounds and lower confidence bounds for each data point;
an outlier elimination mechanism; and
wherein:
the outlier elimination mechanism removes statistical outliers in the data set by generating a first prediction cone for data points in a left sample window, generating a second prediction cone for data points in a right sample window, and determining if data points in a test window reside in the first prediction cone or the second prediction cone; and
a data point in the test window that does not reside in the first prediction cone or the second prediction cone is an outlier.

6. The system of claim 5, wherein the outlier elimination mechanism generates the first prediction cone and the second prediction cone by linear regression of the data points in the left sample window and linear regression of the data points in the right sample window.

7. The system of claim 6, wherein the outlier elimination mechanism moves the left sample window, right sample window, and test window through the data set to remove outliers through out the data set.

8. The system of claim 5, wherein the outlier elimination mechanism determines outliers by a weighted reciprocal of confidence intervals generated by prediction cones.

9. A trending system comprising:
a trending program; and
computer readable medium bearing the trending program; and
wherein:
the trending program comprises a sliding window filter;
the sliding window filter receives a data set from a physical system;
the data set comprises a plurality of data points;
the sliding window filter selects multiple data windows in the data set;
each of the data windows has a subset plurality of the data points in the data set;
the sliding window filter generates upper confidence bounds and lower confidence bounds for each data point using each of the multiple data windows that includes the data point;
the sliding window filter selects an upper confidence bound and a lower confidence bound for each data point that results in the smallest confidence interval for that data point;
wherein, the trending program further comprises an outlier elimination mechanism;
the outlier elimination mechanism removes statistical outliers in the data set by generating a first prediction cone for data points in a left sample window, generating a second prediction cone for data points in a right sample window, and determining if data points in a test window reside in the first prediction cone or the second prediction cone; and
a data point in the test window that does not reside in the first prediction cone or the second prediction cone is an outlier.

10. The trending system of claim 9, wherein the computer readable medium comprises recordable media.

11. The trending system of claim 9, wherein the computer readable medium comprises transmission media.

12. The trending system of claim 9, wherein the sliding window filter outputs a filtered estimate of the data set.

13. The trending system of claim 9, wherein the sliding window filter determines the upper confidence bounds and lower confidence bounds through linear regression and statistical inference of the data set.

14. The trending system of claim 13, wherein the sliding window filter performs the statistical inference using Student-t statistics.

15. The trending system of claim 9, wherein:
the trending program further comprises a trend change detection mechanism;
the trend change detection mechanism determines a first convex hull for a set of upper confidence bounds and a second convex hull for a set of lower confidence bounds;
a comparator mechanism compares the first convex hull and the second convex hull to determining a transition point in the data set; and
an estimated trend of the data set is determined from the transition point.

16. The trending system of claim 15, wherein the trend change detection mechanism compares the first convex hull to the second convex hull by determining if the first convex hull and the second convex hull intersect.

17. The trending system of claim 15, wherein the trend change detection mechanism compares the first convex hull and the second convex hull to determine a transition point in the data stream by determining if the first convex hull and the second convex hull intersect, and by iteratively discarding points in the data set and generating a new first convex hull and a new second convex hull until there is no intersection between the new first convex hull and the new second convex hull.

18. The trending system of claim 9, wherein the outlier elimination mechanism generates the first prediction cone and the second prediction cone by linear regression of the data points in the left sample window and linear regression of the data points in the right sample window.

19. The trending system of claim 18, wherein the outlier elimination mechanism moves the left sample window, right sample window, and test window through the data set to remove outliers through out the data set.

20. The trending system of claim 9, wherein the outlier elimination mechanism determines outliers by a weighted reciprocal of confidence intervals generated by prediction cones.

21. The trending system of claim 9, wherein adjacent windows in the multiple data windows overlap in the data set.

* * * * *